Jan. 11, 1944.   B. BOULOGNE ET AL   2,338,895
MEANS FOR PREVENTING WOBBLING OF VEHICLES
PROVIDED WITH PNEUMATIC SHOCK ABSORBERS
Filed Oct. 12, 1940

INVENTORS
Baltus Boulogne, and
Antonie Pieter Boulogne

BY *[signature]*

ATTORNEY

Patented Jan. 11, 1944

2,338,895

UNITED STATES PATENT OFFICE

2,338,895

MEANS FOR PREVENTING WOBBLING OF VEHICLES PROVIDED WITH PNEUMATIC SHOCK ABSORBERS

Baltus Boulogne and Antonie Pieter Boulogne, Pengalengan, near Bandoeng, Java, Netherland East Indies; vested in the Alien Property Custodian Application October 12, 1940, Serial No. 361,006
In the Netherlands May 9, 1940

2 Claims. (Cl. 267—65)

This invention relates to devices for use with pneumatic shock absorbers used, with or without the associated use of steel springs, to support a vehicle, such devices being effective to control the flow of gas back and forth from one chamber of the pneumatic shock absorber to the other and thus render the action of the shock absorber non-oscillatory.

When one of the wheels, upon which a car or other vehicle is supported by pneumatic shock absorbers, passes over a sharply raised portion of the road the car tends to wobble or oscillate, the air rushing from the chamber on one side of the piston of the shock absorber to some other chamber thereof, and back again. One means of retarding this flow from one chamber to another is disclosed in United States Patent 1,528,910, Flader, but the action of such structure is dependent upon the rapidity of movement of the piston in relation to the cylinder throughout its movement and, particularly when the vehicle is moving rapidly on uneven roads, decreases the resiliency and effectiveness of the shock absorbers.

One of the objects of the present invention is to provide a pneumatic shock absorber structure which will lessen the tendency of the vehicle supported thereby to wobble and will render its support substantially non-oscillatory without materially decreasing the resiliency of support of the vehicle.

A further object is to provide such a structure which will materially lessen the tendency of a vehicle supported by such structure to tilt to a side in making a turn.

A still further object is to provide such a structure of simple, durable and economic construction.

Still further objects will be apparent from the following specification when read with reference to the accompanying drawing, in which—

In general, the invention consists in providing valve means and connections connecting together two chambers of a pneumatic shock absorber, one of which chambers is preferably an auxiliary chamber, and controlling the flow from one chamber to the other differentially from the flow in the opposite direction.

Figure 1:
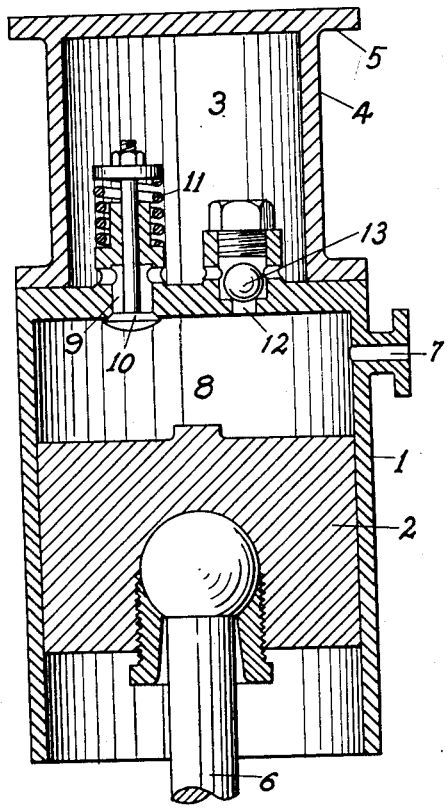
Fig. 1 is a fragmentary view in vertical section of a pneumatic shock absorber structure embodying the invention.

In the embodiment of the invention shown in Fig. 1 a pneumatic shock absorber cylinder 1 has a piston 2 slidably mounted therein, an auxiliary compression chamber 3 being provided in a body 4 suitably secured to the top of the cylinder 1 and provided with a flange 5, or the like, by which it may be secured to the body of the vehicle. A link or pitman 6 is pivotally connected at one end to the piston 2 and is suitably connected at its other end to an axle or other portion of the running gear upon which the body is to be resiliently supported. An inlet opening 7 is provided in the upper part of the cylinder 1 by means of which compressed air from any suitable source is provided to the chamber 8 in the cylinder above the piston 2, it being understood that a plurality of similar pneumatic shock absorbers may be used and subjected to the same pressure through the inlets 7 and that the pressure in the chamber or chambers 8 must be sufficient to support the vehicle body and its load without any danger of the piston striking the upper end of the cylinder. The auxiliary chamber 3, instead of being connected to the compression chamber 8 by one or more vents which permit air to flow with equal facility in either direction, is connected to the chamber 8 by a port 9 closed by a valve 10 that is held closed by a spring 11 so that a predetermined excess of pressure must exist in auxiliary chamber 3 before air will flow therefrom into compression chamber 8, and by a port 12 normally closed by a ball valve or other readily operable non-return valve 13 so that air cannot pass therethrough from auxiliary chamber 3 but may readily pass into auxiliary chamber 3 whenever the pressure in chamber 8 exceeds that in chamber 3, that is, upon the upward movement of piston 2.

It will be understood that, when compressed air is introduced through inlet 7 the pressure in chambers 8 and 3 will be equalized, and that when additional load is added the pressure will be slightly increased but will be equalized by flow from chamber 8 to auxiliary chamber 3. However, when the load is suddenly lessened, particularly when a rebound tends to lift the vehicle body from the running gear and move the cylinder 1 upwardly relative to the piston 2 the pressure in chamber 8 must be lowered by a definite amount, determined by the strength of spring 11, below that in auxiliary chamber 3 before valve 10 will be opened to permit flow of air from auxiliary chamber 3 to chamber 8. In other words, during increase of pressure, by downward movement of the vehicle body, the chambers 8 and 3 act as a single chamber in which the pressure is increased uniformly, while during decrease of pressure, upon upward movement of the vehicle body, the chamber 8 acts alone to oppose such movement until the pressure therein is reduced to a predetermined amount below that of auxiliary chamber 3, whereupon valve 10 opens to permit air to flow from auxiliary chamber 3. The fact that the air can flow less readily from one chamber to the other than it can flow in the opposite direction, and only after a definite difference of pressure has been effected so as to vary the rate of equalization, dampens the relative movement of the piston and cylinder in one direction and substantially eliminates the tendency toward a bounding or oscillating movement of the vehicle body without materially affecting the resilience of support of the vehicle body.

Figure 2:
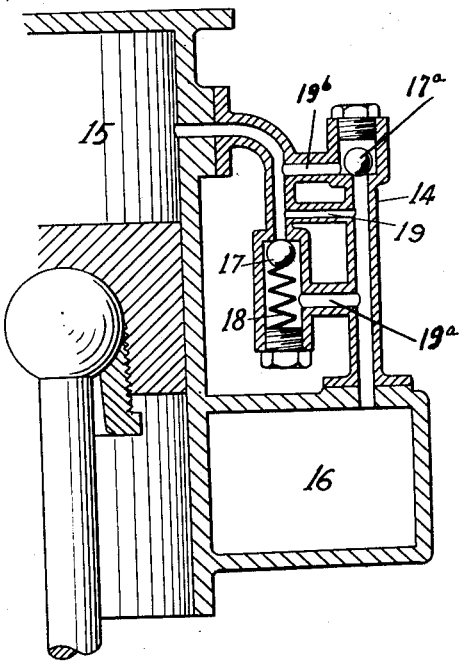
Fig. 2 is a fragmentary view in vertical section of a pneumatic shock absorber including a second embodiment of the invention.

In the embodiment of the invention shown in Fig. 2 the position of the parts is reversed and, in addition, a small vent is added that permanently connects the chambers but only through an opening that is so restricted as to permit only a very slow equalization of pressure in the two chambers as compared with that which tends to occur when the vehicle strikes an abrupt raised portion of the road. In such embodiment a valved connecting structure 14 is provided connecting at its upper end to the compression chamber 15 above the piston of the pneumatic shock absorber and at its lower end to an auxiliary chamber 16 that conveniently may be formed in an integral projection adjacent the lower part of the shock absorber cylinder, it being understood that the ends of the structure 14 may be detachably secured in place by any suitable means. The end passages of the connecting structure 14, respectively connected to the compression chamber 15 and the auxiliary chamber 16, are connected to each other by three separate ports, the port 19 being permanently open but of greatly reduced area while the port 19a is closed by ball 17 under the influence of spring 18 so as to open only when the pressure in compression chamber 15 exceeds by a definite value the pressure in auxiliary chamber 16, and the port 19b is controlled by ball 17a or the like, permitting free flow of air, in addition to the flow through restricted port 19, from auxiliary chamber 16 to compression chamber 15 but closing as soon as the pressure in compression chamber 15 exceeds that in auxiliary chamber 16. In the operation of this embodiment the restricted port 19 serves as a bleeder to slowly effect equalization of pressure in the two chambers 15 and 16. Upon sudden relative movement, or tendency to such movement, between the cylinder and the piston, the air can flow freely in one direction, but in the opposite direction sufficient movement must occur to effect a definite difference in pressure before any air can flow from chamber 15 to chamber 16 in addition to the slight flow through the restricted port 19. The restriction to air flow between the chambers in one direction is therefore different from that to air flow in the opposite direction and the rate of expansion in one direction is varied, with a consequent dampening effect that minimizes the tendency toward a vibrating or oscillating movement of the vehicle body.

Figure 3:
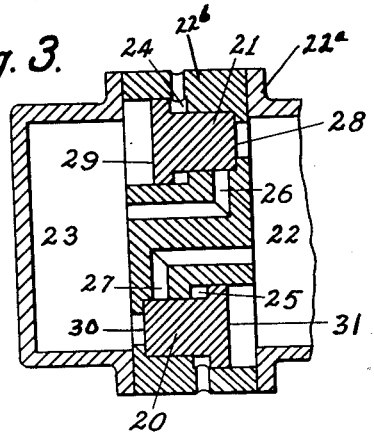
Fig. 3 is a fragmentary view in vertical section of one end of a pressure cylinder connected to a pneumatic shock absorber and a structure including a third embodiment of the invention.

In the embodiment shown in Fig. 3, a chamber 22 is provided in a body 22a which may be the end of a pneumatic shock absorber cylinder or associated therewith, the chamber 22 being either the compression chamber between the end of the cylinder and the piston and consequently containing the air cushion which supports the vehicle or is a chamber connected to such compression chamber and hence subject to the same variations of pressure. To such body 22a a body 22b is suitably secured, such body 22b being counterbored to receive sliding valve members 21 and 20 having, respectively, a small end 28 or 30 and an enlarged end 29 or 31, but oppositely positioned. The spaces 24 and 25 back of the enlarged heads of the valve members 21 and 20, respectively, are connected to atmosphere. A bore 26 connected to auxiliary chamber 23 terminates in a laterally-directed port controlled by valve 21, and a similar port 27 connected to compression chamber 22 is controlled by valve 20.

In the operation of this modification a definite difference in pressure must be built up in one of the chambers before air will flow from chamber 22 to chamber 23 through bore 26 or before air will flow from chamber 23 to chamber 22 through bore 27, and the value of such difference in pressure, in either case, is determined by the construction, that is, by the difference in area of the ends 28 and 29 or in the area of the ends 30 and 31. If, as illustrated, the valves 20 and 21 are of identical construction, and the car strikes an obstruction which increases the pressure in the shock absorber, such pressure which is communicated to chamber 22 will increase by a definite amount before valve 21 will be moved to the left to open bore 26 and permit connection of auxiliary chamber 23 to the chamber 22. Similarly, when the vehicle body tends to rebound and the pressure in chamber 22 is again reduced it must reach a pressure that is less, by a predetermined amount, than the pressure then existing in auxiliary chamber 23 before valve 20 will open bore 27 to permit flow of air from auxiliary chamber 23 into the compression chamber 22. It will be evident that such step-by-step resistance to either an increase or decrease in pressure in chamber 22, and the fact that a definite difference in pressure is necessary, in either sense, before the effect of auxiliary chamber 23 is added to that of compression chamber 22, tends to dampen and minimize any bouncing or oscillating movement of the vehicle body.

Figure 4:
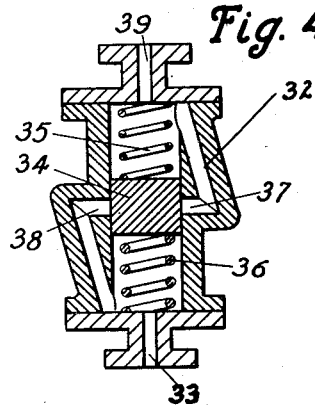
Fig. 4 is a view in vertical section of a structure adapted to be connected between chambers of a pneumatic shock absorber and including a fourth embodiment of the invention.

The embodiment of the invention shown in Fig. 4 likewise constitutes a valve means for connecting together two chambers of a pneumatic shock absorber to permit flow in one direction only when a predetermined pressure difference exists and to permit flow in the other direction only when a greater pressure difference exists. The embodiment comprises a body 32 having a central bore in which a valve member 34 is slidably mounted and is normally held in a central position as shown by a comparatively weak spring 35 above it and a comparatively strong spring 36 below it, such springs abutting, respectively, against an upper end connecting fitting having a channel 39 therein and against a lower end connecting fitting having a channel 33 therein. Laterally directed ports 37 and 38 are normally closed by the valve 34, port 37 being opened to permit flow from channel 39 to channel 33 when valve 34 has moved down a predetermined distance against the action of strong spring 36, and port 38 being opened to permit flow from channel 33 to channel 39 when the valve 34 has been moved upward a like distance against the action of the weak spring 35. It will be understood that the chambers connected by the structure shown in Fig. 4 may be, for instance, a compression chamber such as shown at 15 in Fig. 2 and an auxiliary chamber such as shown at 16 in Fig. 2, the channel 39 being connected to the chamber 15 and the lower channel 33 being connected to the auxiliary chamber 16. In the operation of such structure so connected, a rise of predetermined value in the pressure of the compression chamber will occur before valve 34 moves down sufficiently to add the effect of the auxiliary chamber by permitting flow of air thereinto to effect equalization of pressure, and as the pressure in the compression chamber decreases a similar, but smaller, difference of pressure must be effected before valve 34 moves upwardly far enough to permit flow of air from the auxiliary chamber to the compression chamber. It will be appreciated that, if desired, the springs 35 and 36 may be of equal strength, so that the same difference in pressure will exist before flow in either direction will occur, and that in any case the retardation of flow tends to dampen and minimize any tendency of the vehicle to rebound or oscillate.

It will be appreciated that it is desirable that the movable valve parts be of light weight and easily movable and that, while constant volume auxiliary chamber constructions have been shown, movable walled auxiliary chambers could be used.

It will likewise be understood that while the operation has been described herein with reference to shocks caused when a vehicle, strikes a sudden change in elevation of a roadway a somewhat similar operation is effected when the vehicle makes a comparatively sudden turn, in which case the structure operates to lessen the side-sway or tilting of the vehicle and minimizes the tendency of the vehicle to oscillate laterally.

What is claimed is:

1. In combination with a pneumatic shock absorber comprising two chambers subject to variations of pressure, a device controlling flow of gas from each of said chambers to the other comprising a structure having an opening therein, and having its ends connected, respectively, to said chambers, a valve member slidably positioned in said opening, and a pair of by-passes normally closed by said valve member and opened to permit flow between said chambers when said valve member is moved a predetermined distance in either direction from its normal position.

2. A pneumatic shock absorbing device comprising two chambers subject to variations of pressure, a device controlling flow of fluid from each of said chambers to the other comprising a structure having a by-pass therein connected to both of the chambers, a valve slidable in said structure, and springs at opposite sides of said valve normally maintaining said valve in position to close said by-pass, the spring at one side of said valve exerting less pressure on the valve than the spring at the opposite side of said valve and said opposite sides of said valve being subject to the pressures prevailing in the respective chambers, whereby when the pressure in each chamber exceeds by a predetermined amount the pressure in the other of said chambers said valve will be actuated to open said by-pass and establish communication between the two chambers

BALTUS BOULOGNE.
ANTONIE PIETER BOULOGNE.